United States Patent Office 3,478,860
Patented Nov. 18, 1969

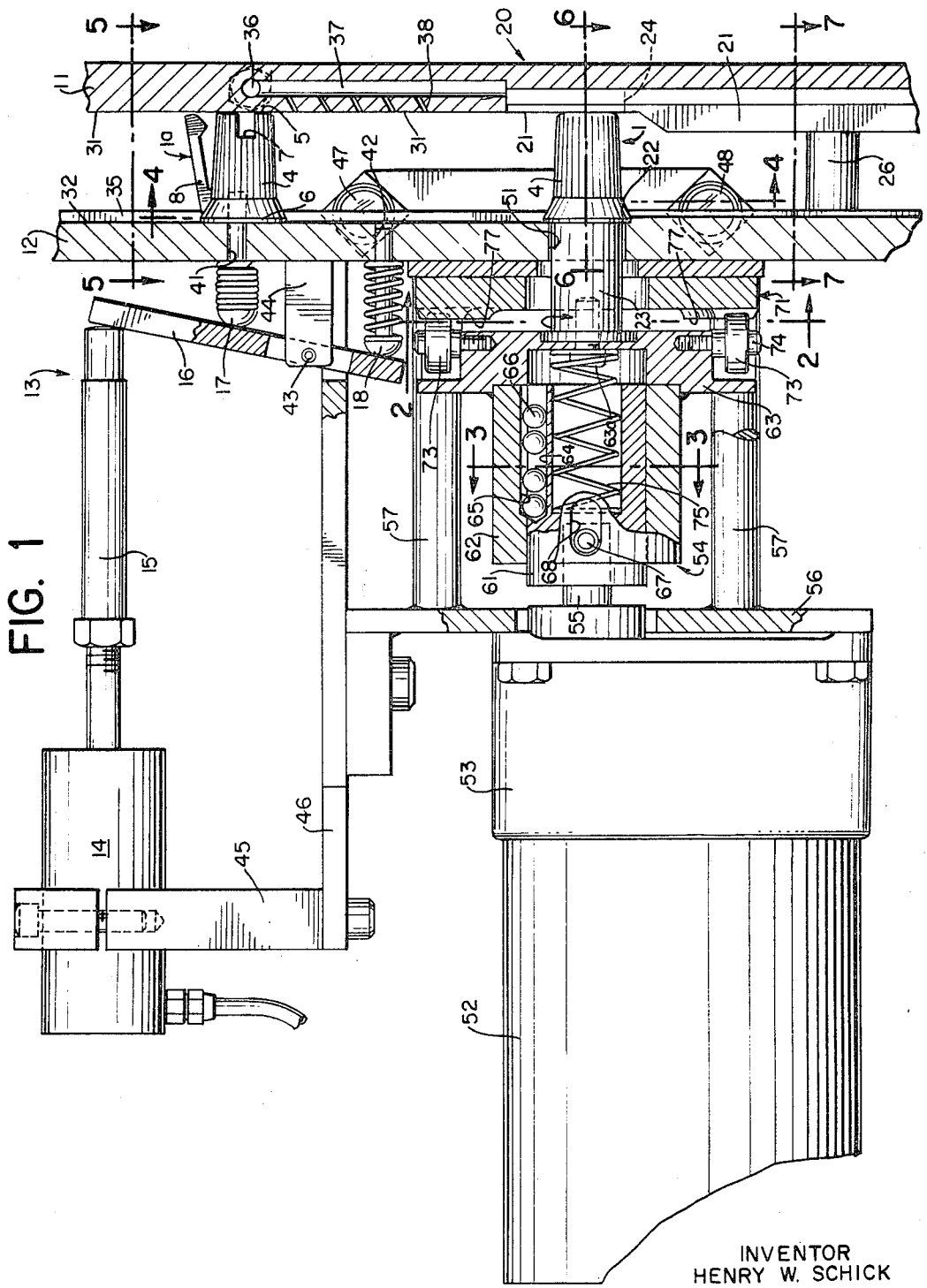

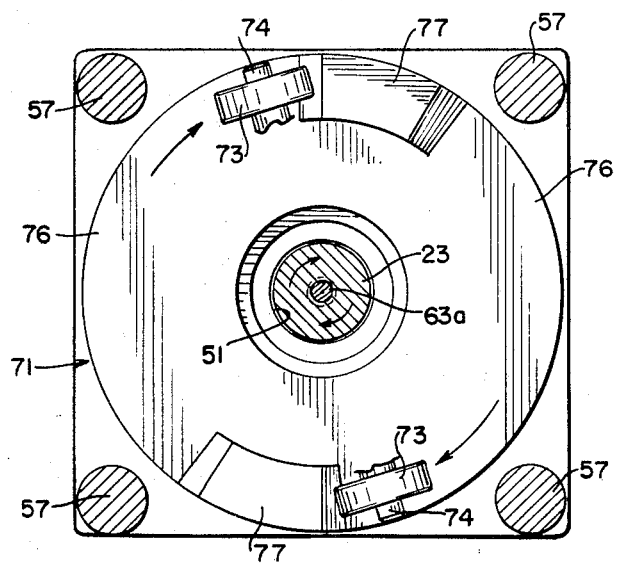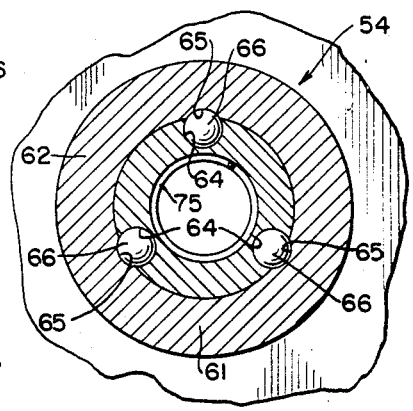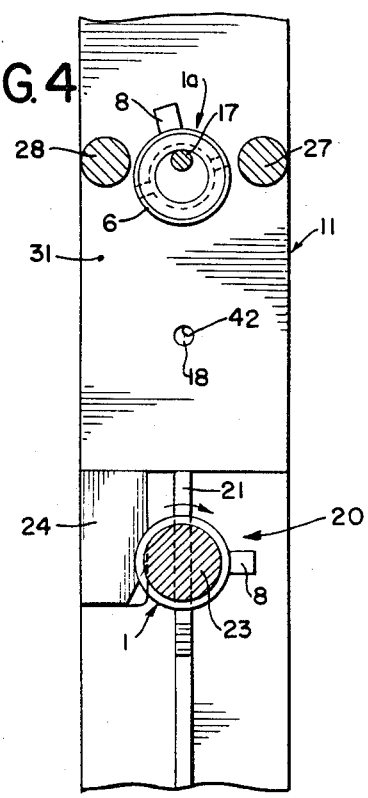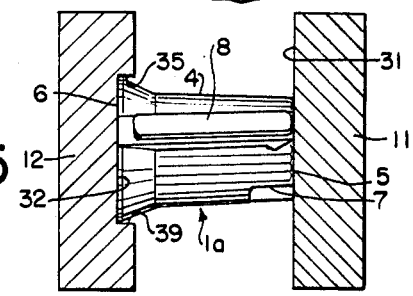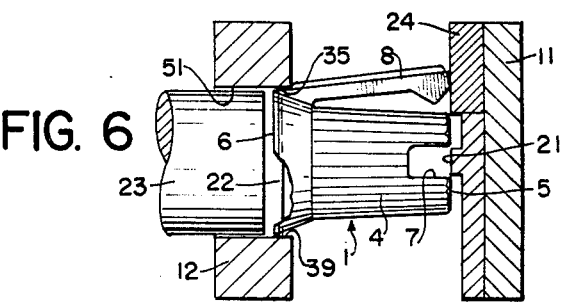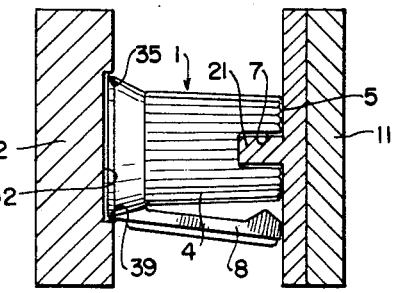

3,478,860
APPARATUS FOR ORIENTING ARTICLES
Henry W. Schick, Commack, N.Y., assignor to Gilbert Manufacturing Company, Inc., Long Island City, N.Y., a corporation of New York
Filed May 1, 1967, Ser. No. 635,230
Int. Cl. B65g 47/24
U.S. Cl. 198—33
13 Claims

ABSTRACT OF THE DISCLOSURE

Apparatus for angularly orienting articles moving along a predetermined path in which articles are sequentially rotated to a predetermined angular position by aligning the articles with an index means.

---

This invention relates to article handling apparatus of the type employed in automatic manufacturing processes. More particularly, this invention relates to apparatus for angularly orienting articles to ensure that the articles are uniformly oriented for a subsequent manufacturing step. Thus, the apparatus of the present invention eliminates the time and labor costs associated with the manual orientation of the articles.

In accordance with the present invention a novel machine is provided in which a number of like articles can be sequentially oriented to a predetermined angular position in rapid order. The machine receives a number of such articles preliminarily aligned in a passageway and they are sequentially gated to an orienting station. All of the articles have the same characteristic orienting portion, such as a channel or a projection, and an indexing member complementary to the orienting portion of the article is located at the orienting station. A rotatable member is located at the orienting station and this member also moves axially to first engage the article and then rotate it to bring its characteristic orienting portion and the indexing member into mating relationship. This operation is effected sequentially and rapidly to provide for automatic orientation of the articles to ready them for presentation to another manufacturing machine or step Accordingly, it is an object of the present invention to provide apparatus for automatically orienting a number of articles in sequence.

Another object is to provide a machine for sequentially orienting articles to a predetermined angular position by rotating such article until a characteristic orienting portion thereon mates with an index member on the machine.

An additional object of this invention is to provide a machine for sequentially orienting articles by rotating the articles until a channel formed in each article mates with a rail on the machine.

A further object is to provide a machine for orienting articles each having a projection from one side, by rotating the articles until a channel formed in each article mates with a rail on the machine and all of the projections are located on the same side of the rail.

Other objects and advantages of the present invention will be apparent from the following detailed description and accompanying drawings which set forth the principle of the invention and, by way of example, the best mode contemplated of applying that principle.

In the drawings:

FIG. 1 shows a side elevational view, partially broken away and partially in section of the article orienting apparatus of the present invention;

FIG. 2 is a cross-sectional view taken along line 2—2 of FIG. 1, showing a detailed plan view of the cam surface and cam followers;

FIG. 3 is a cross-sectional view taken along line 3—3 of FIG. 1, showing a detailed view of the axially flexible coupling;

FIG. 4 is a cross-sectional view taken along the line 4—4 of FIG. 1, showing a plan view of the path of the articles to be oriented;

FIGS. 5–7 are cross-sectional views showing the orientation of the articles.

FIG. 1 shows an article orienting machine embodying the principles of the present invention. For purposes of illustration, the articles handled by the apparatus of FIG. 1 are shown as light socket husks of the type which might be employed in certain types of lighting systems including Christmas tree lighting sets. It will be appreciated by those skilled in the art, however, that, with only minor modifications, the apparatus of FIG. 1 is capable of handling other and different types of articles to be oriented.

Basically, each of the light socket husks 1 shown in FIG. 1, and as shown in greater detail in FIG. 5, comprises a generally cylindrical body portion 4 having a base 5 and a flared mouth 6 for ultimately receiving a light bulb. A channel 7 is formed in base 5 to receive a conventional double-lead electric wire (not shown) and a suitable wire-retaining insert member (also not shown). A hook or clamp member 8 projects from one side of the light socket husk to permit the finished light socket to be attached to some convenient support such as, for example, a Christmas tree bough. As shown in FIG. 1, hook member 8 is integrally molded as part of the body and projects from body portion 4 at approximately right angles to channel 7. Light socket husks 1 may be of the type shown and described in greater detail in U.S. patent application Ser. No. 493,472, filed October 6, 1965, now Patent No. 3,372,362, by the present inventor, and assigned to the present assignee.

Generally, the article orienting machine of the present invention will be employed in combination with other machines in order to provide a complete automatic manufacturing operation. For example, in the automatic manufacture of electrical fixtures, such as the Christmas-tree type light sockets described in U.S. patent application Ser. No. 493,472, now Patent No. 3,372,362, the light socket husk is first molded of a suitable thermoplastic material in an automatic molding press of the type well known to those skilled in the art. The husks are released from the automatic molding press and transported by a mutable conveyor system (not shown) to a disc-feed hopper, or vibrating bowl which partially orients the husks so that the mouths 6 of the husks face in one direction while the bases 5 of the husks face in the opposite direction. The partially oriented husks are then fed along a predetermined path or track to the orienting machine of the present invention which orients the husks, so that their channels 7 are all aligned and the hooks 8 are all on the same side as will be explained in greater detail hereinafter. The uniformly oriented husks then proceed along a track to a contact inserting machine which inserts a pair of electrical contacts into the husk. Uniform orientation of the husks is necessary in order to ensure uniform polarity of the electrical contacts as is required by certain electrical wiring standards.

The final step in the manufacturing operation is to connect the finished light socket husks to electrical wires in order to form Christmas-tree type lighting sets. This is accomplished by driving a conventional double-stranded electrical wire and a wire retaining insert member into the channel 7 in the base 5 of each husk so that the ends of the electrical contacts pierce the insulation of the wire to make electrical connections with the conductive strands therein. This step of the manufacturing operation may be performed by a machine of the type described in the copending patent application Ser. No. 635,244 of the present inventor filed May 1, 1967 and assigned to the same assignee.

Basically, in the preferred embodiment shown in FIG. 1, the article orienting apparatus of the present invention comprises a pair of guide plates 11 and 12 for guiding the articles to be oriented along a predetermined path. A gating mechanism, generally designated 13, and also comprising an air cylinder 14, shaft 15, operating arm 16, and stop pins 17 and 18 protruding through guide plate 12 operates at one point along the path of travel of the articles to release them sequentially, one at a time into an orientation station generally designated 20. The articles are oriented onto a rail 21 which is located on plate 11 and is adapted to ride in the channel 7 of each husk. A step 22 is provided opposite rail 21 in plate 12 which stops the progress of the husk at orientation station 20 if rail 21 is not riding in channel 7. Also, a rotating member 23 is resiliently urged into frictional engagement with the husk to rotate the husk and urge channel 7 of the husk over rail 21, so as to disengage mouth 6 of the husk from step 22, thereby allowing the husk to progress along its predetermined path between guide plates 11 and 12. In addition, a structure 24 located to one side of rail 21, as shown more clearly in FIG. 4, is provided to contact the end of hook member 8 so as to prevent channel 7 from riding onto rail 21 in the particular angular orientation. This ensures that channel 7 will ride onto rail 21 only when hook member 8 is on the opposite side of rail 21 from structure 24.

Describing the machine in greater detail, in FIG. 1 guide plates 11 and 12 are maintained in fixed spaced relation by suitable support members such as, for example, support post 26 shown in FIG. 1 and support posts 27 and 28 shown in cross-section in FIG. 4. In the preferred form of the apparatus, the spacing between respective opposed surfaces 31 and 32 of guide plates 11 and 12 will accommodate the husks 1 with sufficient clearance to permit the husks to move relatively freely along the predetermined path defined by surfaces 31 and 32, but not with enough play to allow the husks to become cocked and thus jam the apparatus. As shown in cross-section in FIG. 5, guide plate 12 includes side walls 35 and 39 for guiding the mouth 6 of the husk. Thus, as seen, the husks ride down path with their top and bottom surfaces engaging respective surfaces 31 and 32.

In the preferred embodiment shown in FIG. 1, guide plates 11 and 12 and the rest of the apparatus are arranged vertically so that the partially oriented husks, coming, for example, from a molding machine and a vibrator-swirl feed mechanism as explained above, move downward along the predetermined path defined by surfaces 31 and 32 by the force of gravity. If desired, compressed air may be introduced through a coupling 36 and into a manifold 37 within plate 11, and thence through small, downwardly slanted openings 38 to surface 31 to simultaneously impel the husks downward and lubricate their passage. Although the force of gravity is the prime motive force for moving the husks in the preferred embodiment of the present invention shown in FIG. 1, it will be appreciated by those skilled in the art that the principles of the present invention embrace other conventional means for moving the husks, such as, for example conveyor belts, or vibrating rails.

For efficient operation of the apparatus, it is desirable that the husks 1 at the station 20 be oriented unencumbered, that is, without contacting other husks. The gating mechanism 13 prevents the next successive husk 1a approaching the orienting station 20 from interfering with the orientation of husk 1. In the preferred embodiment, gating device 13 includes a pair of spring-loaded stop pins 17 and 18 which extend through openings 41 and 42 in guide plate 12. Stop pins 17 and 18 are alternately extended through openings 41 and 42 by the operation of a lever 16 which is pivoted at 43 on support structure 44 and actuated by shaft 15 of the double-acting air cylinder 14. The cylinder 14 is mounted on a support structure 46 by a clamp 45. Double acting air cylinder 14 may be of the type well known to those skilled in the art such as, for example, the double-acting air cylinders manufactured by the Airmite Corporation. In the preferred embodiment shown in FIG. 1, the operation of double-acting air cylinder 14 is controlled by a pair of photocells 47 and 48 in a manner which will be explained in greater detail hereinafter.

Generally, after a husk 1 is released by gating mechanism 13, it drops downward between guide plates 11 and 12 into the orientation station 20 until it stops against step 22 in surface 32 of guide plate 12 as illustrated by husk 1 of FIG. 1. In the preferred form of the invention, step 22 projects approximately 1/16 of an inch into the path of the husks to be oriented. At the orientation station 20 the upper surface of rail 21 is substantially flush with surface 31 of guide plate 11, so that husk 1 will ride smoothly, no matter what its orientation, from surface 31 onto rail 21 until stopped by step 22. Rail 21 tapers upwardly from orientation station 20 to its full height at a point somewhat beyond (below) the station, as shown in FIG. 7. The full height of the rail 21 is substantially that of channel 7 of the husk. The relationships between step 22 and surface 32 and between rail 21 and surface 31 may be better understood by comparing FIGS. 5, 6 and 7, which are successive cross-sectional views of the path of the husks between guide plates 11 and 12.

Similarly, in order to handle the specific type of light socket husk shown in FIG. 1, the upper surface of structure 24 for deflecting husk hook 8 is also flush with surface 31 of plate 11. It should be understood, however, that the particular level of the upper surface of structure 24 with respect to the upper surface of rail 21 depends upon the location of the projection from the side of the article to be oriented with respect to its base.

The orientation of husk 1 is accomplished by continuously rotating cylindrical member 23 which is extendable through an opening 51 in guide plate 12 to frictionally engage the top wall surface surrounding mouth 6 or the internal wall of the mouth 6 somewhat below the top surface of a husk 1 to rotate the husk and urge its channel 7 onto rail 21. Cylindrical member 23 is driven by an electric motor 52 and a gear box 53 acting through an axially flexible coupling generally designated 54. All of this structure is mounted on a plate 56 which is supported by support members 57 mounted on the face of guide plate 12 remote from the husk. Electric motor 52 and gear box 53 may be of the conventional type well known to those skilled in the art. The optimum speed of output shaft 55 of gear box 53, which drives coupling 54, is determined for each particular type of article to be oriented by the machine of the present invention. For example, when orienting light husks of the type shown in FIG. 1, a speed of 175 r.p.m. has been found to be effective.

Axially flexible coupling 54 transmits rotational motion from output shaft 55 of gear box 53 to the cylindrical orienting member 23 and also allows cylindrical member 23 to move axially. A first hollow cylindrical member 61 is rigidly mounted on shaft 55, and a second hollow cylindrical member 62 is rigidly mounted coaxial with the first cylindrical member 61 on a cam-follower-supporting member 63 as by welding for example. Cam supporting member 63 is in turn rigidly connected to orienting member 23 as by screw 63a, for example. A plurality of longitudinal grooves 64 are formed in the exterior surface of the first cylindrical member 61 and a plurality of corresponding longitudinal grooves 65 are formed in the interior surface of second cylindrical member 62, as shown more clearly in the cross-sectional view of FIG. 3. Ball bearings 66 are disposed in the channels formed by the corresponding grooves 64 and 65. This arrangement permits members 62, 63, and 23 to move freely in an axial direction with respect to cylindrical member 61, but permits no relative angular movement between members 61 and 62. Similarly, a key 67 mounted on first cylindrical member 61 coacts with a keyway 68 formed in second cylindrical member 62 to permit relative axial movement while preventing relative angular movement.

A circular cam 71 is mounted on the surface 72 of guide plate 12. A plurality of rotatable cam follower wheels 73 journaled on pins 74, which are in turn mounted on cam-follower-supporting member 63, are urged into contact with the camming surface of cam 71 by a spring 75 which is located within the hollow portion of first cylindrical member 61. One end of spring 75 engages support 63 and its other end engages the end wall of first cylinder 61. When cam-follower wheels 73 ride on the dwell portions 76 of cam 71, continuously rotating orienting member 23 is urged into contact with the mouth inner wall or the surrounding top wall of the mouth of husk 1 by spring 75. When cam-follower wheels 73 ride on lobe portions 77 of cam 71, orienting member 23 is retracted into opening 51, so as to permit the next subsequent husk to drop into station 20 for orientation against step 22 in guide plate 12.

The design of cam 71 involves a balancing of two factors. The angles subtended by dwells 76 should be as large as possible in order to achieve maximum rotation of the husk to be oriented each time it is contacted by orienting member 23. On the other hand, the angles subtended by lobes 77 should be at least large enough that orienting member 23 will be retracted for a sufficiently long period of time to allow a husk to drop from a position in contact with the upper surface of orienting member 23, when extended, into contact with step 22 for orientation. For example, in the preferred form of the present invention in which orienting member 23 rotates at a speed of approximately 175 r.p.m., each of the lobes 77 of cam 71 subtends an angle of about 60° and each of the dwells 76 subtends an angle of about 120°.

At the moment of arrival of husk 1 and orientation station 20, orienting member 23 must of necessity be in a retracted condition brought about, as explained above, by the coaction of cam-follower wheels 73 with lobes 77 of cam 71. Base 5 of husk 1 rides on the upper surface of rail 21, mouth 6 of husk 1 is held in position by step 22 and guide rails 35 and 39, and the husk is more or less randomly oriented about its axis. Shortly, thereafter, the continuing rotation of shaft 55 causes cam-follower wheels 73 to move from lobes 77 to dwells 76, permitting spring 75 to push rotating member 23 into frictional engagement with mouth 6 of husk 1, thus rotating husk 1 and urging base 5 against the upper surface of rail 21. Husk 1 may rotate up to 120° (less slippage) provided channel 7 does not first become aligned with rail 21. After 120°, member 23 is momentarily retracted by the cam action and then applied again for another 120° rotation, and so on until alignment is achieved.

The action spring 75 through member 23 pushes channel 7 of husk 1 down over rail 21 when it becomes aligned therewith. Orienting member 23 extends further to follow the motion of husk 1 until cam-follower wheels 73 contact the surface of dwells 76, at which point the mouth 6 of husk 1 clears step 22 so that the correctly oriented husk 1 is free to drop down to the next stage of the automatic manufacturing process. Prior to the alignment of channel 7 with rail 21, cam-follower wheels 73 skim along without quite touching the surface of dwells 76.

Structure 24 contacts the end of hook 8 as shown in FIG. 6, in order to prevent channel 7 from slipping over rail 21, when hook 8 is on that side of rail 21. Further rotation of husk 1 by the action of orienting member 23 will bring hook 8 to the correct orientation on the opposite side of rail 21, so that channel 7 will slip over rail 21 as described.

In operation, the first husk entering the machine to be oriented drops downward between guide plates 11 and 12 until it stops against stop pin 18 which is normally extended through opening 42 in guide plate 12. In this position the first husk blocks the light from a source (not shown) to photocell 47. When this occurs, photocell 47 actuates air cylinder 14 through a suitable electronic circuit and an electrically operated air valve (not shown). The circuit and air valve may be of the conventional type well known to those skilled in the art. When actuated, air cylinder 14 extends its shaft 15 to push operating arm 16 to a position to extend to stop pin 17 through opening 41 in guide plate 12 to engage the next husk 1a, thus, maintaining it in the position shown in FIG. 1, above orienting station 20. At the same time, operating arm 16 releases spring loaded stop pin 18, allowing it to retract through opening 42 in guide plate 12. This releases husk 1 and permits it to drop to the orientation station 20 where it is stopped by step 22 of guide plate 12 as shown in FIG. 1.

The orientation of husk 1 is then effected as has been explained in greater detail hereinabove. The angle through which a husk 1 has to be rotated by cylindrical member 23 depends mainly upon the original orientation of the husk as it enters orientation station 20 and, to a lesser extent upon somewhat unpredictable factors such as friction, for example. As explained above, for each contact with cylindrical member 23 the husk can be rotated a maximum of about 120°.

After orientation and release from step 22, husk 1 drops downward between guide plates 11 and 12 past photocell 48. As husk 1 passes by, it blocks the light to photocell 48, energizing a circuit (not shown) to actuate air cylinder 14 to retract shaft 15. This retracts stop pin 17 and extends stop pin 18. When this occurs husk 1a drops downward from the position shown in FIG. 1 into contact with stop pin 18, thus blocking the light to photocell 47, and initiating a repetition of the previous cycle to permit husk 1a to drop into station 20 while blocking successive husks coming into the machine.

Although the principles of the present invention have been illustrated by reference to a preferred form of apprataus for orienting Christmas-tree type light socket husks, it will be appreciated by those skilled in the art that, with only minor modifications, the apparatus described would be able to handle other, different types of articles. For example, the present invention embraces apparatus having an index groove or plurality of grooves for orienting articles having corresponding projections or groups of projections.

What is claimed is:

1. Apparatus for angularly orienting an article moving along a predetermined path, said article having a channel therein, said apparatus comprising:
   means for guiding an article along a predetermined path,
   a rail complementary to said channel of an article disposed adjacent said path for mating with said channel when said article has a certain angular orientation,
   rotating means located on said path adjacent said rail with its axis of rotation intersecting said path, and
   means for resiliently urging the end of said rotating means into engagement with said article to rotate said article to a position to bring its channel into mating relationship with said rail.

2. The apparatus of claim 1, further comprising:
   stop means adjacent said index means for stopping the movement of an article along said path when the orienting portion of the article is not in mating relationship with said index means, the article being released from the stop means when it is rotated to a position to bring about a mating relationship.

3. Apparatus of the type described in claim 2 wherein said stop means comprises a projection extending into said predetermined path opposite said index means.

4. Apparatus of the type described in claim 3 wherein said continuously rotating means is disposed adjacent said stop means on the side of said predetermined path opposite said index means and is axially extendable toward said index means.

5. Apparatus of the type described in claim 4 including means for periodically retracting said rotating means to permit successive articles to encounter said stop means.

6. Apparatus of the type described in claim 5 wherein said retraction means comprises a cam surface mounted in a fixed position with relation to said predetermined path, and a cam follower mounted on said rotating means.

7. Apparatus of the type described in claim 5 further comprising gate means disposed on said predetermined path for temporarily interrupting the motion of said articles before reaching said stop means, said gate means releasing articles singly to said station for orientation.

8. Apparatus of the type described in claim 5 wherein said predetermined path is defined by a pair of vertical guide plates so that articles are moved along said path primarily by the force of gravity.

9. Apparatus of the type described in claim 8 including means for blowing air through one of said guide plates to facilitate the passage of articles along said predetermined path.

10. Apparatus of the type described in claim 1 wherein said index means includes a structure disposed to one side of said rail for contacting a projection from the side of an article to prevent the channel of the article from riding on said rail unless the projection is oriented to the opposite side of said rail from said structure.

11. Apparatus of the type described in claim 6 wherein said continuously rotating means comprises an orienting cylinder connected to a drive motor through an axially flexible coupling; said axially flexible coupling comprising a first hollow cylinder mounted on the motor shaft, a second hollow cylinder enclosing said first hollow cylinder, said second hollow cylinder being axially movable and angularly immovable with respect to said first cylinder, and wherein said means for resiliently urging said rotating means into engagement with an article comprises a spring mounted within said first hollow cylinder and acting against said motor shaft and said orienting cylinder.

12. Apparatus for angularly orienting articles, each article having a channel formed in one end thereof and a projection formed on a side thereof, said apparatus comprising:

guide means for guiding articles along a predetermined path, said guide means comprising a first plate for contacting the channeled ends of the articles, and a second plate for contacting the opposite ends of the articles;

gate means disposed along the path formed by said guide means for releasing articles successively for orientation, said gate means comprising a pair of stop pins extendable into said path through openings in one of said plates for engaging successive articles, said stop pins being alternately extended and retracted through said one plate to successively release articles one at a time for orientation;

orienting means for receiving articles from said gate means, said orienting means comprising, a rail on one plate for engaging the channel in an article when and only when the channel is aligned with said rail and a step formed in the other plate opposite said rail, said step extending into the path to stop an article when its channel is not engaged with said rail, a rotating member axially extendable through an opening in one plate to engage a portion of the article other than the channel portion, means for driving said rotating member and means for resiliently urging said rotating member in an axial direction into frictional engagement with the article so as to rotate the article and urge its channel into engagement with said rail thereby disengaging the article from said step.

13. Apparatus as described in claim 12 further comprising a structure disposed to one side of said rail for contacting the projection of an article so as to prevent the channel from engaging said rail unless the article is rotated so that its projection is to the opposite side of said rail, and retraction means for periodically retracting said rotating member, said retraction means comprising a circular cam surface mounted on the reverse side of said second plate, and a cam follower projecting radially from said continuously rotating member for engaging said cam surface.

References Cited

UNITED STATES PATENTS

| | | | |
|---|---|---|---|
| 3,021,938 | 2/1962 | Cadwallader | 221—173 |
| 2,341,373 | 2/1944 | Gantzer | 193—43 |
| 2,342,680 | 2/1944 | Melzer. | |
| 2,421,916 | 6/1947 | Underwood | 193—43 |
| 2,997,185 | 8/1961 | Morean et al. | 193—43 X |
| 3,253,735 | 5/1966 | Brown et al. | 193—43 X |
| 3,317,015 | 5/1967 | Buggele et al. | 193—43 |

RICHARD E. AEGERTER, Primary Examiner

U.S. Cl. X.R.

193—43; 221—173